(12) United States Patent
Kamphuis et al.

(10) Patent No.: US 8,113,040 B2
(45) Date of Patent: Feb. 14, 2012

(54) TIRE RUNOUT GAUGE

(75) Inventors: Dwain L. Kamphuis, West Olive, MI (US); Thomas W. Knowles, II, Holland, MI (US)

(73) Assignee: K-Line Industries, Inc., Holland, MI (US)

( * ) Notice: Subject to any disclaimer, the term of this patent is extended or adjusted under 35 U.S.C. 154(b) by 51 days.

(21) Appl. No.: 12/825,749

(22) Filed: Jun. 29, 2010

(65) Prior Publication Data
US 2011/0005309 A1      Jan. 13, 2011

Related U.S. Application Data

(60) Provisional application No. 61/225,034, filed on Jul. 13, 2009.

(51) Int. Cl.
*G01M 17/02* (2006.01)
(52) U.S. Cl. .......................................................... 73/146
(58) Field of Classification Search .................. None
See application file for complete search history.

(56) References Cited

U.S. PATENT DOCUMENTS

| | | | |
|---|---|---|---|
| 4,630,377 A * | 12/1986 | Schneider et al. | 33/611 |
| 6,595,053 B2 | 7/2003 | Parker | |
| 7,040,026 B2 * | 5/2006 | Hirano et al. | 33/203.13 |
| 7,926,338 B2 * | 4/2011 | Oblizajek et al. | 73/146 |
| 2009/0205420 A1 * | 8/2009 | Andersen | 73/487 |
| 2011/0036158 A1 * | 2/2011 | Oblizajek et al. | 73/146 |

OTHER PUBLICATIONS

Sales brochure entitled "Tire and Wheel Radial Run-Out Gauge," Specialty Products Company, Longmont, Colorado, date unknown (but at least one year prior to the present filing date).

* cited by examiner

*Primary Examiner* — Andre Allen
(74) *Attorney, Agent, or Firm* — Price Heneveld LLP

(57) ABSTRACT

A runout gauge includes a stand (such as a tripod), and a gauge bar pivotally mounted on the stand. The gauge bar includes a wheel on its upper end positioned above the pivot for rollingly engaging an outer surface of a vehicle tire, and further includes a pointer located a greater second distance below the pivot. By this arrangement, movement of the wheel on the tire due to runout causes the pointer to move along an amplified path having a length greater than the movement of the wheel, thus making it easier to read. The illustrated stand includes indicia for measuring movement of the pointer, and also includes gauge slides on a frame component that abut the pointer in a manner showing an extent of the pointer's movement, which relates to the runout on the tire.

9 Claims, 4 Drawing Sheets

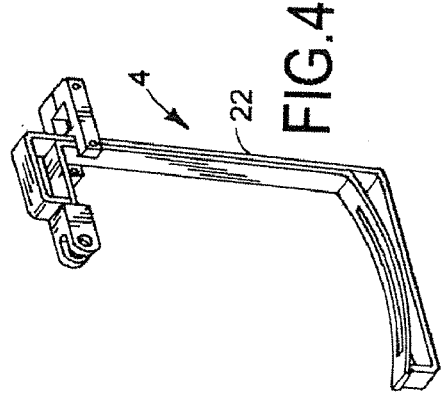
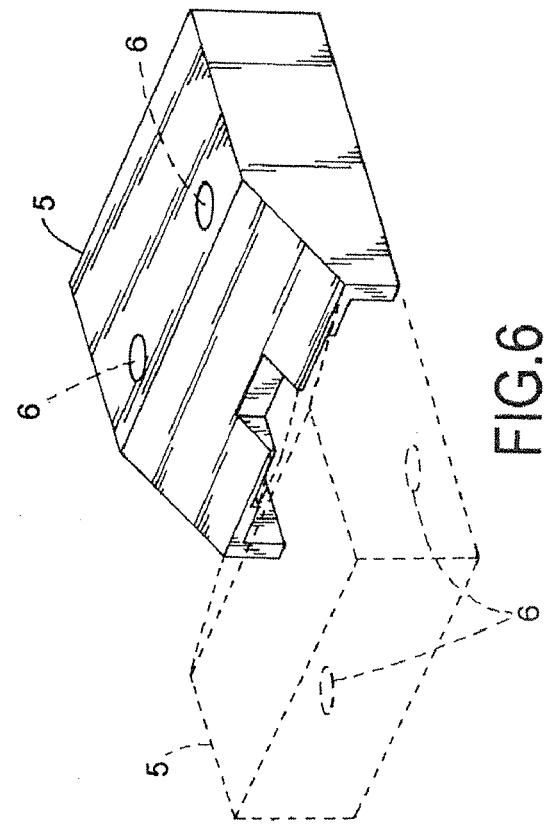
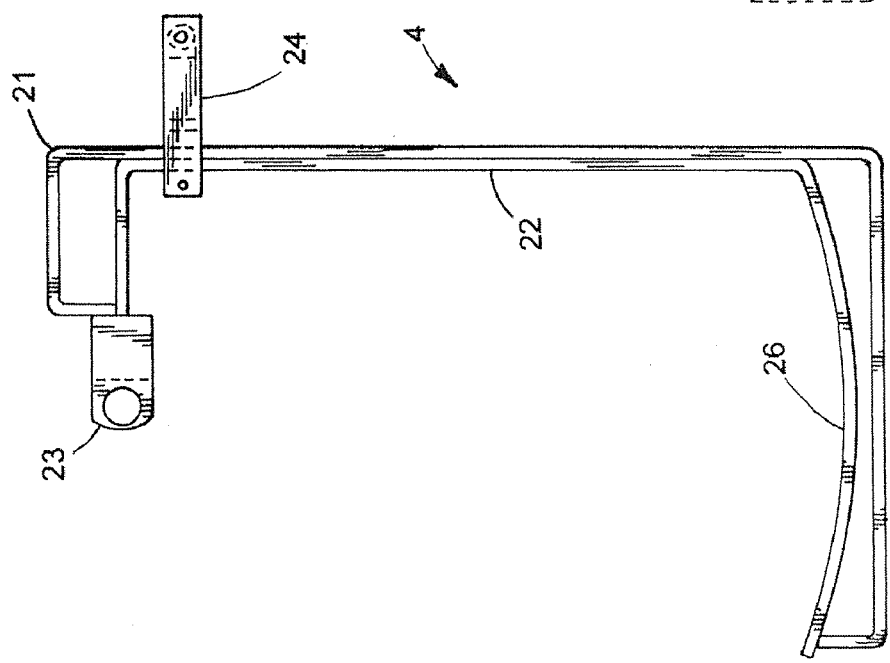

TIRE RUNOUT GAUGE

This application claims benefit under 35 U.S.C. §119(e) of provisional application Ser. No. 61/225,034, filed Jul. 13, 2009, entitled TIRE RUNOUT GAUGE, the entire contents of which are incorporated herein in their entirety.

BACKGROUND

The present invention relates to a device and method for measuring tire runout, and more specifically to a device and method for accurately measuring tire runout but which is mechanically simple, intuitive to use, yet very accurate.

"Tire runout" describes OD tolerances/variations of a tire relative to its rotational axis when a wheel is rotated on a vehicle. This is important since variations in tire runout result in "humps" on the tire that cause it to shake and vibrate, even after the tire has been balanced. Further, the shake and vibration can be amplified due to harmonic vibrations that come and go at various speeds (depending on how many "humps" are in the tire). Most tires should have less than 0.030 to 0.050 inches of runout. Some trucks and SUVs can tolerate up to 0.060 inch of radial runout. Tire manufacturers set runout specifications, and it is important that small garages and other lower-volume operations be able to accurately measure runout to ensure that the tires they install are within the manufacturer's specification. The devices should be accurate but easy to work with, durable but not overly costly, and relatively simple but effective.

Some measuring devices for measuring tire runout use needle gauges as an indicator. A problem is that in many locations, tire installers are often untrained or not familiar with the needle gauges and thus do not use them correctly (nor take care of them, which can result in poor function). Additionally, the gauges get dirty and/or are difficult to read. For example, the difference between a runout measurement of 0.58 and 0.062 on a runout gauge can be very important, . . . yet it is extremely difficult to tell the difference on most gauges since the gauge's needle indicator moves quickly over a peak of the runout and then quickly drops off as the tire is rotated. Unless the operator takes extra time, the measurement is potentially not accurate, even when an accurate gauge is used. Another problem is that some operators do not have good eyesight, such that they are unable to tell the difference between a narrow range of points on the gauge which, when combined with poor lighting, dirty gauges, and marginal gauge operation, combines to lead to additional inaccurate readings.

Some measuring devices for measuring tire runout are complicated and expensive. For example, see Parker U.S. Pat. No. 6,595,053. While such complicated and expensive devices may be appropriate for sophisticated operations, high-volume operations, and/or OEM assembly plants, they are much too complicated and expensive for most small garage shops and vehicle dealerships.

SUMMARY OF THE PRESENT INVENTION

In one aspect of the present invention, a runout gauge includes a stand, and a gauge bar pivotally mounted on the stand for movement about a pivot. The gauge bar includes a roller wheel on its upper end positioned a first distance from the pivot and adapted to rollingly engage an outer surface of a vehicle tire. The gauge bar further includes a pointer located a greater second distance from the pivot so that movement of the roller wheel on the tire due to runout causes the pointer to move along a path having a length greater than the movement of the roller wheel. The stand includes indicia extending along the path of the pointer for measuring movement of the pointer. By this arrangement, the runout is easy to measure and read.

In a narrower form, the stand includes a frame component extending along the path, the indicia being on the frame component, and at least one gauge slide is slidably on the frame component for engaging the pointer and showing an extent of the runout on the tire.

These and other aspects, objects, and features of the present invention will be understood and appreciated by those skilled in the art upon studying the following specification, claims, and appended drawings.

BRIEF DESCRIPTION OF DRAWINGS

FIGS. 4-5 are perspective and side views of the gauge frame weldment of FIG. 1.
FIG. 6 is a perspective view of a gauge slider of FIG. 1.

DETAILED DESCRIPTION OF PREFERRED EMBODIMENTS

Figure 3:
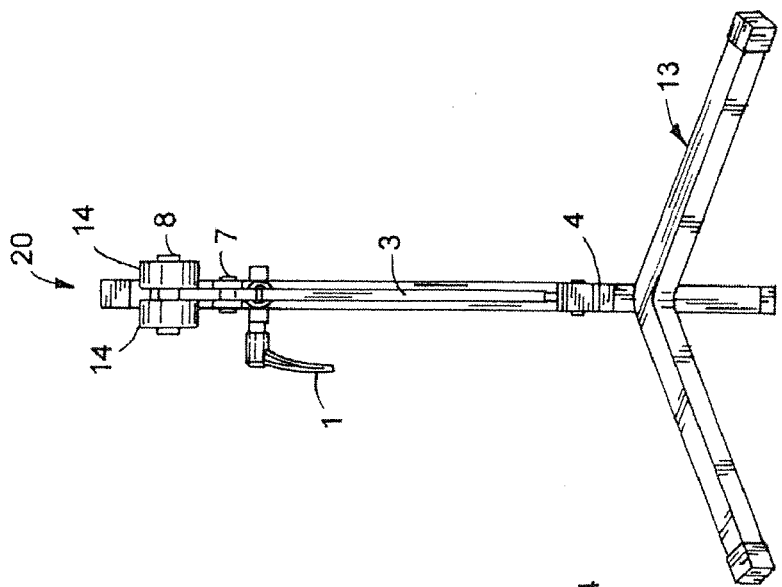
FIGS. 2-3 are side and front views of FIG. 1.

A listing of components includes the following:
1 adjustment handle
2 axle retaining ring (two)
3 gauge bar (upper end supports wheels, longer lower end is pointer)
4 gauge frame
5 gauge slide (two)
6 magnet (four)
7 pivot pin
8 roller axle
9 rubber foot (four)
10 set screw (two)
11 spring
12 spring pin
13 tripod (stable stand, or mobile frame)
14 wheel (roller)

Figure 2:
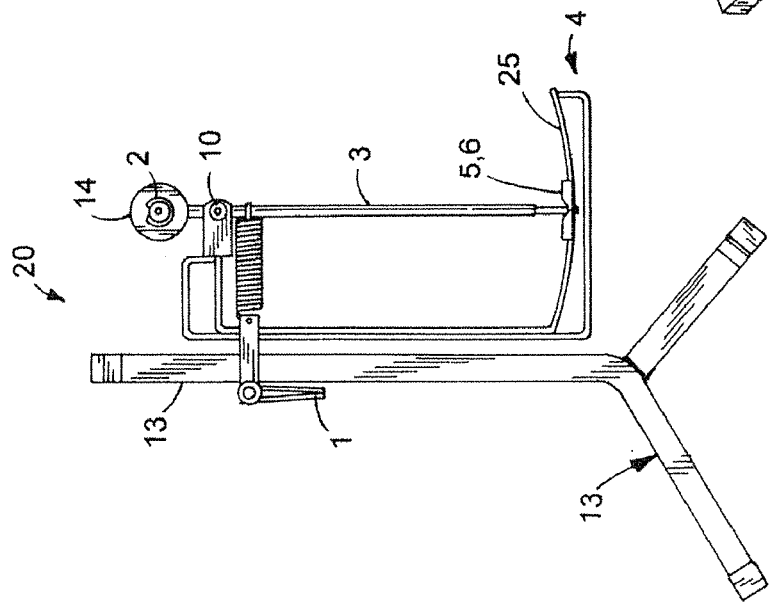
Figure 1:
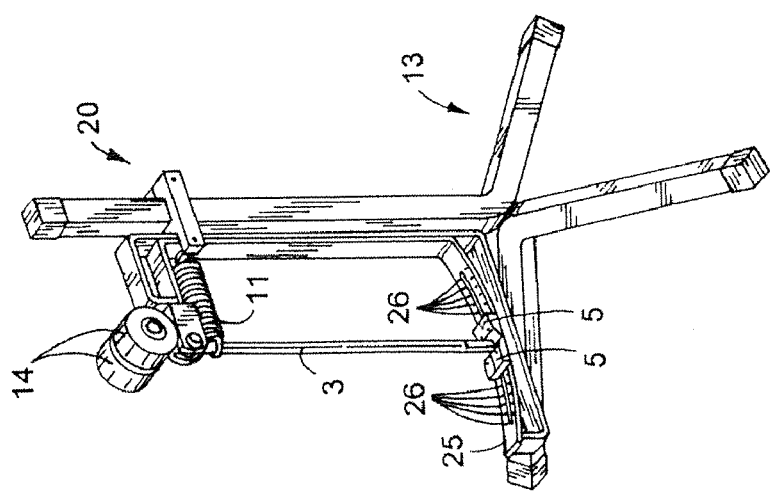
FIG. 1 is a perspective view of the present runout gauge.
Figure 7:
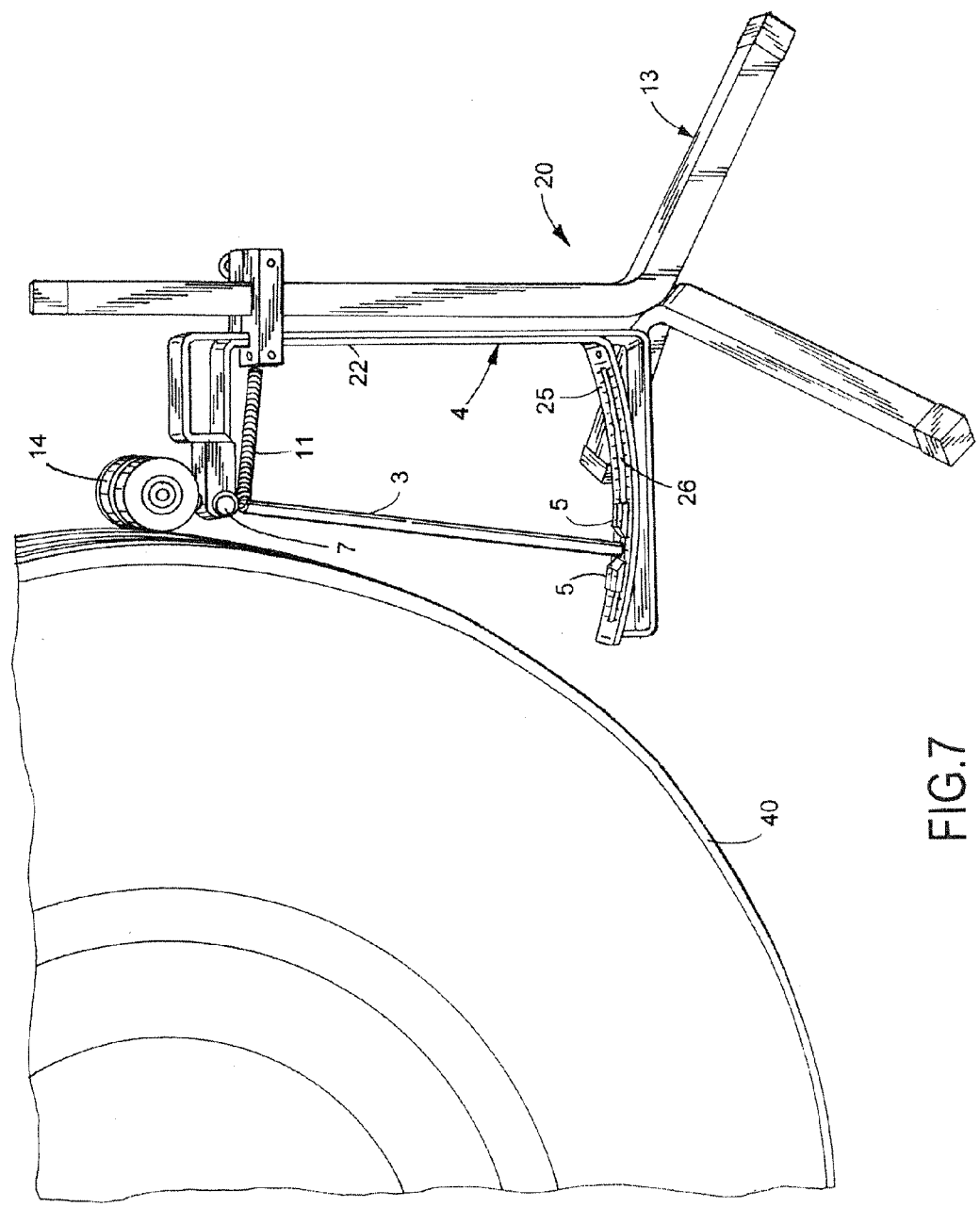
FIGS. 7-8 are photographs showing a prototype of the device in perspective, FIG. 7 showing its use on a truck tire (on a truck) and FIG. 8 showing it standing alone.
Figure 8:
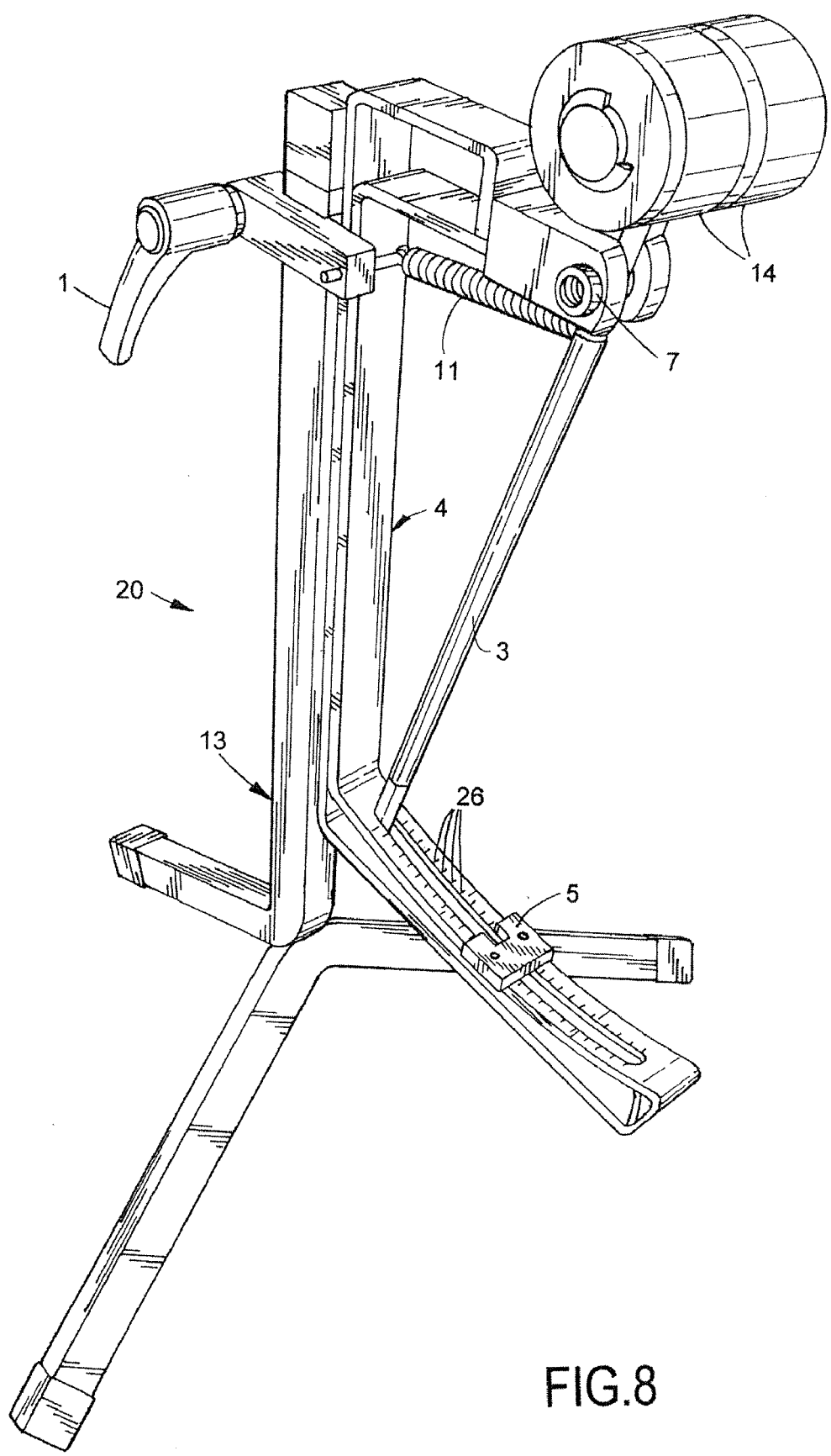

The gauge 20 (FIGS. 1-3) includes a tripod 13 formed from a pair of bent tubes attached together to define three legs for stability and an upstanding post. The gauge frame weldment 4 (FIGS. 4-5) includes two L-shaped frame members 21 and 22 attached together to define a lower horizontal leg and a vertical leg, and a rod holder 23 and spring holder 24 on opposite sides of a top of the vertical leg. The gauge bar 3 is mounted by pivot pin 7 to the rod holder 23 using set screw 10. Preferably the pivot pin 7 is located high on the gauge bar 3, so that the upper portion above the pivot pin 7 is a short distance and the lower portion below the pivot pin 7 is a large distance. Thus, when the wheels 14 on the (short) upper portion is moved a first distance, the lower portion 28 of the gauge bar 3 has a pointer end 28 that moves a much greater distance. For example, in the illustrated arrangement, the ratio of the lengths of the short upper portion to the long lower portion is 1:6. Thus, a 0.050 inch runout causes the lower end of the gauge bar 3 to move 0.300 inches; and a 0.060 inch runout causes the lower end to move 0.360 inches. The indicia 26 discussed below allows an operator to clearly see how much runout was present in the tire being tested.

The wheels 14 are mounted to a top of the gauge bar 3 by retaining rings 2 which engage their axle on either side of a top of the gauge bar 3. A bottom end of the gauge bar 3 fits into an upwardly open slot in the lower horizontal leg 25 of the frame member 22. The lower horizontal leg 25 of the frame member 22 has a radius such that its curvature generally matches the sweeping path of the lower end (i.e., "pointer" portion) of the gauge bar 3. Spring 11 is connected between the gauge bar 3 and the upright post of the tripod 13, such that the spring biases the gauge bar 3 toward the post.

Gauge slides 5 (FIGS. 1 and 6-8) are placed on a top surface of the lower horizontal leg 25 of the frame member 22, and can be moved apart by engagement of the lower end 28 (also called "pointer") of the gauge bar 3. The gauge sliders 5 each include a lower surface that straddles the horizontal leg 25 of the frame member 22, and are attached to the horizontal leg 25 by magnets 6. The top surface of the horizontal leg 25 of the frame member 22 includes marks or indicia 26 that indicate a movement of the wheel 14 as the gauge bar 3 moves. This indicia 26 is carefully made so that it can be easily read to give the runout movement of the wheels 14. Given the location of the pivot and the short upper portion and long lower portion of the gauge bar 3, the indicia 26 is much easier to read because of the "mechanical amplification" of the pointer's (28) movement. Notably, the present gauge 20 can be used without any slides 5 by simply reading the movement of the pointer 28. Alternatively, it is contemplated that a single slide can be used with a slot for pointer 28, where the slot has a length representing the runout tolerance. For example, if the slot has a length representing 0.060 inches of runout, the slide will be moved by the pointer 28 if the runout on the tire being measured is greater than 0.060 inches. Restated, in this example, the tire fails if the slide (with runout-toleranced slot) is moved by the pointer's (28) movement.

In operation, the gauge 20 is placed adjacent a tire 40 (FIG. 7) so that wheels 14 roll along the outer diameter of the tire 40. For example, the truck's frame can be jacked up so that the tire 40 (and its rims) can be rotated. As the wheel 14 rolls, it moves across runouts on the tire. This causes the gauge bar 3 to rotate about pivot pin 7, which in turn causes the lower end of the gauge bar 3 to swing back and forth. As the lower end swings back and forth, it engages the gauge slides 5 and abuttingly pushes them to the greatest runout conditions. After a tire 40 is rotates a full rotation, the gauge slides 5 are left in positions showing exactly the high and low runout conditions . . . and also the distance between them (i.e., the runout variance dimension).

The present gauge is relatively low cost, simple to assembly and use, intuitive to use, and very effective at providing repeatable and accurate readings. Further, the present gauge eliminates the need to use expensive needle gauges.

Persons skilled in this art will understand that a related method of use is also well described herein, and further is unobvious and hence patentable. Persons skilled in this art will also understand that the present design is ornamental and hence patentable from a design perspective.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A runout gauge comprising:
    a stand;
    a gauge bar pivotally mounted on the stand for movement about a pivot, the gauge bar including a roller wheel on its upper end positioned a first distance from the pivot and adapted to rollingly engage an outer surface of a vehicle tire and further including a pointer located a greater second distance from the pivot so that movement of the roller wheel on the tire due to runout on the tire causes the pointer to move along a path having a length greater than the movement of the roller wheel;
    the stand including indicia extending along the path of the pointer for measuring movement of the pointer.

2. The gauge defined in claim 1, wherein the stand includes a frame component extending along the path, the indicia being on the frame component, and including at least one gauge slide on the frame component for engaging the pointer and showing an extent of the runout on the tire.

3. The gauge defined in claim 1, wherein the roller wheel is located above the pivot.

4. The gauge defined in claim 1, including a spring biasing the roller wheel against the tire during use.

5. The gauge defined in claim 1, wherein the stand includes an upright post member and at least three legs extending radially from a bottom of the upright post member.

6. The gauge defined in claim 1, including a gauge frame attached to the stand and supporting the gauge bar and indicia.

7. The gauge defined in claim 6, wherein the gauge frame is clamped to the stand by fasteners.

8. The gauge defined in claim 6, wherein the gauge frame is L-shaped and includes an arcuate surface on which the indicia is supported.

9. A method for measuring runout on a vehicle tire, comprising steps of:
    providing a stand with a gauge bar pivotally mounted on the stand for movement about a pivot, the gauge bar including a roller wheel on its upper end positioned a first distance from the pivot and further including a pointer located a greater second distance from the pivot so that movement of the roller wheel on the tire due to runout on the tire causes the pointer to move along a path having a length greater than the movement of the roller wheel; the stand including indicia extending along the path of the pointer for measuring movement of the pointer; and
    rotating the vehicle tire as the roller wheel rollingly engages the tire such that the pointer moves along the indicia with amplified movement to show runout of the tire on the indicia.

* * * * *